United States Patent [19]

Slavic

[11] Patent Number: 4,469,318
[45] Date of Patent: Sep. 4, 1984

[54] WORK PIECE GUIDE FOR TABLE SAWS AND THE LIKE

[76] Inventor: Fred M. Slavic, Fisher Hill, Fitzwilliam, N.H. 03447

[21] Appl. No.: 370,965

[22] Filed: Apr. 22, 1982

[51] Int. Cl.³ .............................................. B27B 27/02
[52] U.S. Cl. ............................... 269/91; 269/254 CS; 269/315; 144/249 B; 144/253 F; 83/447; 188/82.7
[58] Field of Search .............. 83/446, 447, 450, 477.2, 83/438; 144/249 B, 253 F; 188/82.7; 269/239, 254 CS, 318, 303, 315, 91

[56] References Cited

U.S. PATENT DOCUMENTS

| | | | |
|---|---|---|---|
| 1,022,176 | 4/1912 | Boothby | 144/253 F |
| 1,535,596 | 4/1925 | French | 83/450 X |
| 1,705,808 | 3/1929 | Chichester et al. | 144/249 B |
| 1,799,738 | 4/1931 | Dirschauer et al. | 83/446 |
| 2,657,601 | 11/1953 | Bentley | 83/446 |
| 2,679,871 | 6/1954 | Ford | 83/450 X |
| 2,799,303 | 7/1957 | Lee | 83/447 X |
| 2,801,656 | 8/1957 | Ford | 83/447 X |
| 3,101,104 | 8/1963 | Sullivan | 83/447 X |
| 3,738,403 | 6/1973 | Schwoch et al. | 83/446 X |

Primary Examiner—Frederick R. Schmidt
Assistant Examiner—Steven P. Schad
Attorney, Agent, or Firm—William Nitkin

[57] ABSTRACT

A device for holding a work piece against a table while urging it against a guide fence when the work piece is being operated on by a table saw or the like having a pair of wheels rotatably mounted on a plate member supported on the end of first and second arms, the other ends of which are held by a frame member with a spring member extending from one upper arm to the opposite lower arm, the arms forming a parallelogram and being rotatably mounted to apply force to pressure the wheels against the table, the frame being at an angle to the guide fence so that the wheels are at an angle towards the fence in the direction of the movement of the work piece.

2 Claims, 6 Drawing Figures

WORK PIECE GUIDE FOR TABLE SAWS AND THE LIKE

BACKGROUND OF THE INVENTION

1. Field of the Invention

This invention relates to an improved work holder and guide adapted to urge a work piece such as a piece of wood against a stationary guide such as a saw fence as it is fed to and past the means operating thereon such as a cutting blade or a table saw or other woodworking cutting machine.

2. History of the Prior Art

Work holders to hold and direct work pieces such as wood on saws and the like against stationary guides such as fences are known in the prior art. Many of such devices utilize one or more rollers which may have their axes inclined slightly toward the stationary guide or fence and which rollers exert pressure on the work piece. Some of these rollers are fitted with means to prevent their backwards rotation in order to prevent rearward movement of the work piece or "kickback". An example of such a device is found in U.S. Pat. No. 3,738,403 to Schwoch et al. In this device inclined rollers grip the work piece or board, urging it toward the stationary guide or fence and the rollers are held against the work piece by springs. Other such devices utilizing rollers are disclosed in U.S. Pat. Nos. 2,679,871 to Ford; 2,801,656 also to Ford; 1,067,360 to McSorley; and 2,773,525 to Schutz.

SUMMARY OF THE INVENTION

It is an object of this invention to provide a safe and improved means for holding and guiding a work piece such as a wooden board against a fence or other stationary guide as it is fed past the operation means such as a saw blade or other cutting device. By securely holding such work piece, the device of this invention not only helps to provide a straighter cut but also assists in making the work procedure safer for the operator. The device of this invention helps prevent "kickback" of the work piece and also will accommodate different stock thicknesses without adjustment. It is useful even with warped stock as it will adjust and hold it flat against the fence. In many instances the device can be operated with one hand, leaving the other hand free to remove the cut stock. This is especially useful when cutting multiple pieces which can be cut one after the other with the following piece pushing the prior pieces in one quick operation.

The device of this invention embodies rollers in an extremely compact and efficient manner which can be easily mounted and dismounted from the machine on which it is used. It is a further object of this invention that these rollers be mounted in such a fashion to allow them to adapt to different thicknesses of the work piece without needing adjustment while at the same time maintaining pressure on the work piece. The device of this invention can also be easily reversed so that the guide fence on which it is mounted can be positioned on either side of the cutting blade. It is a further object of this invention to provide a novel pawl arrangement in which a single pawl coacts between the two rollers to prevent their backwards rotation. The rollers of this invention can be constructed of wheels covered with rubber or other resilient or gripping material. The wheels can also have serrated or other textured surfaces around their exterior and are adapted to turn freely on shaft members which are mounted on a plate. This plate has two other shafts mounted parallel to a line drawn through said wheels on which are rotatably attached a first and second arm respectively. The other end of each arm is rotatably mounted on first and second shafts respectively affixed to a support member forming a parallelogram. The support member is mounted on an auxiliary fence which is held to the fence of the equipment being used. A spring extending from one of the upper shafts to the diagonally opposite lower shaft where the arm attaches to the plate creates pressure to hold the plate in a downward position against the work table. Forward movement by a work piece under the rollers lifts them upwards while still being urged downward by the spring tension. The wheels are inclined slightly toward the guide fence, tending to urge the work piece against the fence as the work piece is pushed through. A pawl prevents the wheels from rotating backwards and is mounted on a pin on the plate between the wheels as will be described in further detail below.

DESCRIPTION OF THE PREFERRED EMBODIMENT

Figure 1:
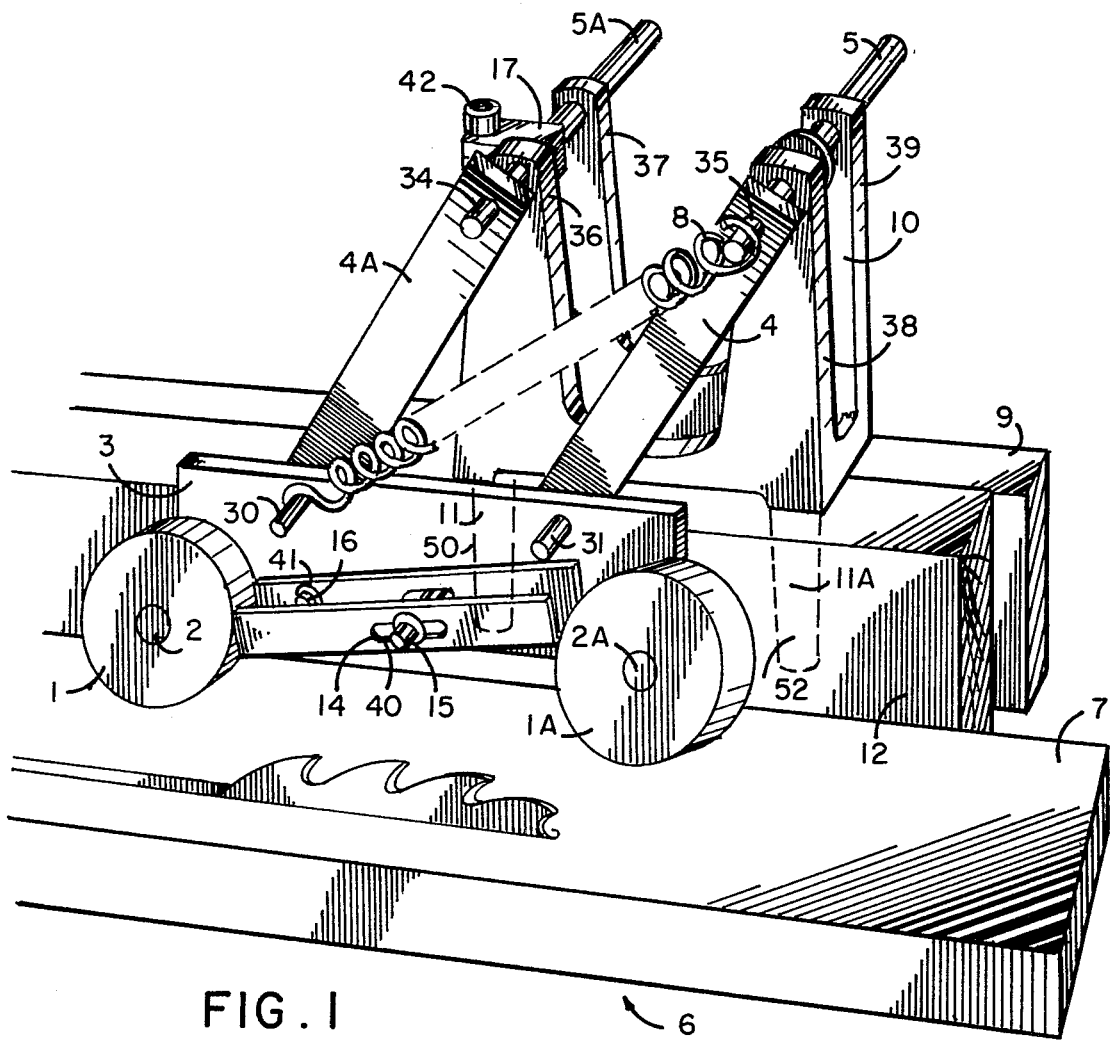
FIG. 1 illustrates a perspective view of the device of this invention.
Figure 1A:
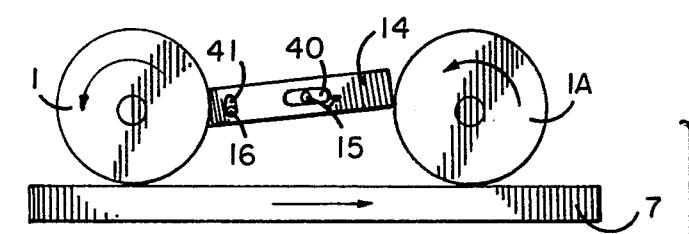
FIG. 1A illustrates two diagrammatic views of the wheels in a rear rotating position and in a forward rotating position.
Figure 1A:
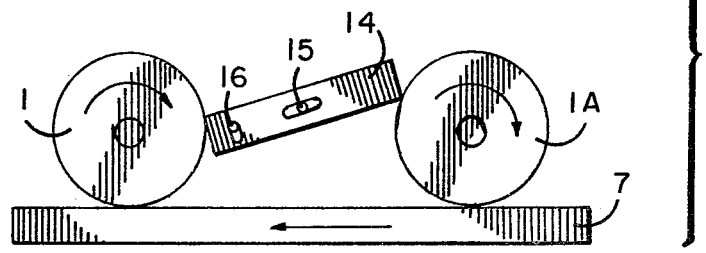
Figure 2:
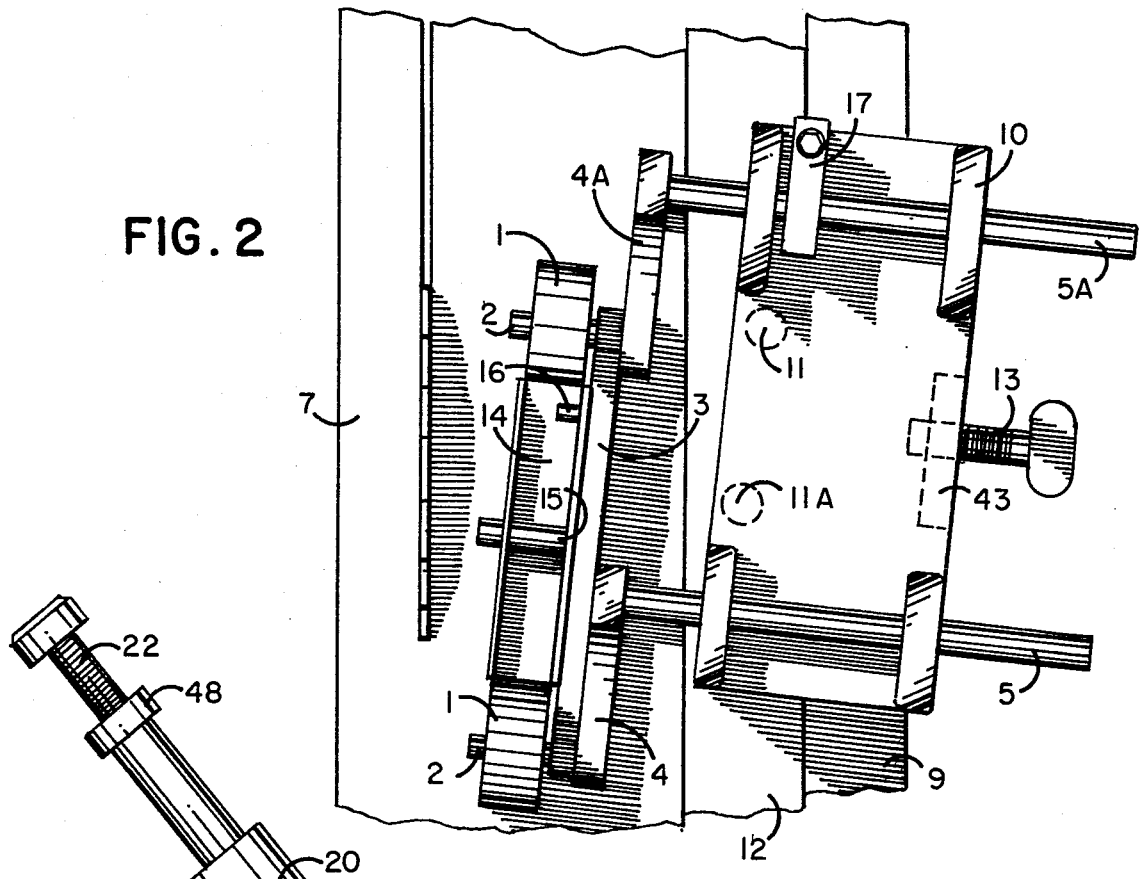
FIG. 2 illustrates a plan view of the device of this invention.
Figure 3:
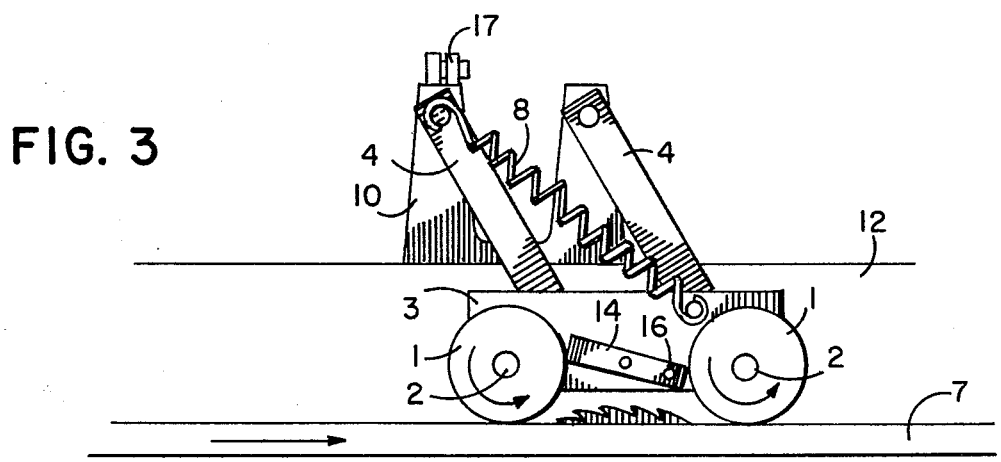
FIG. 3 illustrates a side view of the device showing it in reverse with fence on left side of blade.

FIG. 1 illustrates a perspective view of the device of this invention. Seen in this view are wheels 1 and 1a which may be covered around their outsides by rubber or other gripping and resilient material. Wheels 1 and 1a are affixed to and turn freely on shafts 2 and 2a which are mounted and separated apart from one another on plate member 3. Plate member 3 has a first and second shaft member 30 and 31 affixed thereto on a line parallel to a line drawn through said wheels but somewhat thereabove. Affixed to shaft members 30 and 31 in a rotatable manner are the bottoms of first and second arm members 4 and 4a respectively. These arm members extend upward to and have apertures 34 and 35 at their tops for receipt of a third and fourth shaft members 5 and 5a respectively which are insertable into apertures 34 and 35 where they are positioned so that they are parallel to and said third and fourth shafts 5 and 5a being substantially the same distance apart as said first and second shafts 30 and 31 in said plate member, thereby forming a parallelogram configuration between said first, second, third and fourth shafts in which said arms 4 and 4a are parallel to one another at all times. Third and fourth shafts 5 and 5a are supported in a rotational manner by frame 10 which is mounted on auxiliary guide fence 12. Spring member 8 extends from the end of said fourth shaft 5 diagonally between said arm members to said first shaft 30 and thereby exerts pressure urging plate member 3 downward. When a work piece is placed under the rollers and pushed into the saw blade, the wheels are urged downward thereon by the action of spring 8 between first and fourth shaft members 5 and 30, thereby holding and urging the wood to the table. The wheel members as seen in FIG. 2 are at a slight angle inclined toward the fence so as to provide an action to force the work piece in toward the fence. Should the thickness of the work piece change, the wheels would move upwards thereby merely increasing tension on spring 8 but with no other adjustment necessary. Also in FIG. 2 frame member 10 can be seen with the third and fourth shafts 5 and 5a passing therethrough. The device is affixed to fence 9 by means of having pins 11 and 11a extend from the bottom of frame 10 which pass into apertures 50 and 52 defined in the auxiliary fence 12 which is adapted to rest up against the standard fence 9 utilized as part of the machine. Clamp screw 13 which is held by projection 43 protruding from the bottom of frame 10 extending down below frame 10 may tighten against fence 9 providing secure attachment of the device of this invention. By loosening clamp screw 13, the device of this invention can be lifted upwards with pins 11 and 11a coming out of apertures 50 and 52 in auxiliary wood fence 12. The collar 17 can adjust the distance between the rollers and guide fence 9. To prevent the rollers from rotating backwards which movement is undesirable and can be dangerous, pawl 14 is provided mounted on frame 3 between wheels 1 and 1a by pin 15 on which it can rotate and slide back and forth due to the pin's movement in lateral aperture 40 defined in pawl 14. This arrangement is most clearly seen in the diagrammatic view 1a. Stop pin 16 is also mounted on frame 3 passing into aperture 41 within the pawl member wherein the pin can be moved in a limited upwards and downwards motion. When the wheels are turning in a normal clockwise motion as seen in the lower view of FIG. 1A, the pawl rests lightly on the wheels without impeding their motion. But if the wheels should begin to turn backwards, the friction of the wheels on pawl 14 would force it into a more horizontal position thereby rotating it to a more horizontal position on pin 15 and moving it upwards on pin 16 which would jam pawl 14 between the wheels, preventing any further rearward rotation. Pin 16 also prevents the pawl from being forced beyond the horizontal position which movement would be undesirable as the wheels would then be released. Because of the angle of arms 4 and 4a, backwards pressure on the blocked wheels would tend to force the rollers downward against the work piece thus increasing their holding of the rearwardly urging work piece. If one wished to place the device of this invention on the other side of the fence, one could remove the device as described above and shift the stop pin 16 to a position 16a as seen in FIG. 3 so that the wheel rotation could occur in the opposite direction as seen in FIG. 1. Auxiliary fence 12 would be turned upside down, reversing the positioning of apertures 50 and 52 which arrangement would maintain the angles of the rollers toward the fence.

Figure 4:
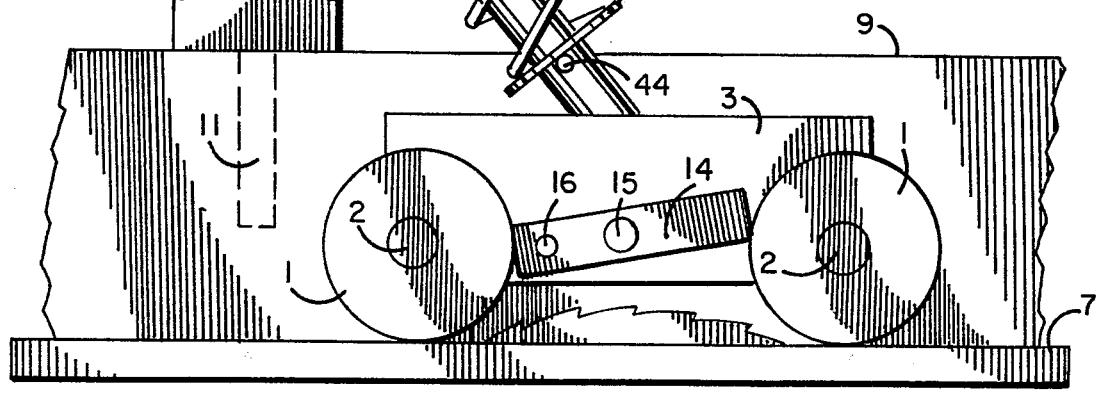
FIG. 4 illustrates an alternate embodiment of this invention utilizing a single post support member.
Figure 4A:
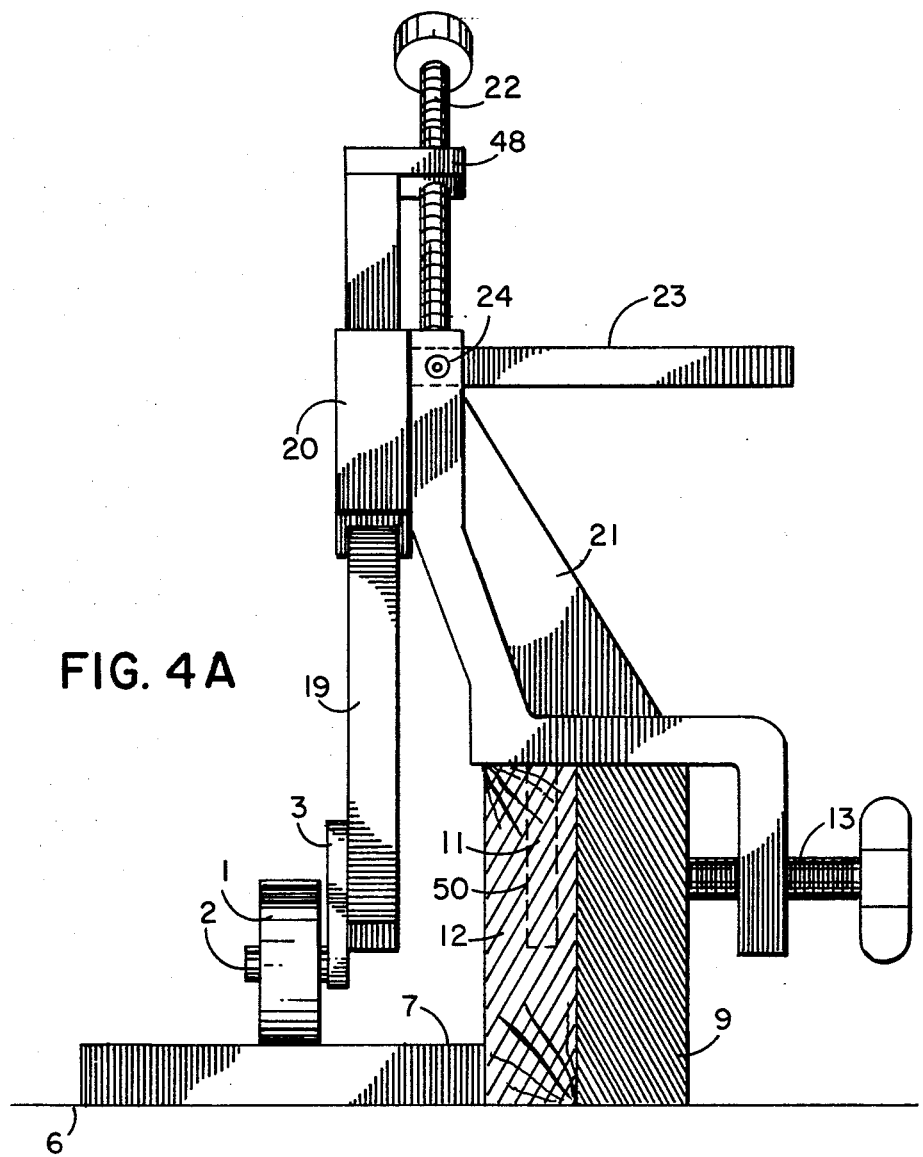
FIG. 4A illustrates a front view of the embodiment illustrated in FIG. 4.

FIG. 4 illustrates an alternate embodiment of the device of this invention wherein the roller/plate assembly is held against the work piece by rod member 19 rigidly affixed to the plate. Rod 19 is held and slides within guide member 20 which is mounted on frame 21 which frame is held by pin 11 in auxiliary fence 12 similar to the way the first embodiment is held to the fence. Rod 19 and guide 20 can be of rectangular cross section or, if they are circular in cross section, there can be a spline of some sort to prevent any rotation of rod 19 in guide 20. Spring member 47 urges and holds the roller/plate assembly against the work piece. Screw 22 mounted through arm 48 at the top of rod 19 bears against support frame 21 and regulates the distance of the wheels from the table. Because of the angle of rod 19, forward motion of the work piece will lift wheels 1 against the pressure of spring 47 so that the wheels will ride over the work piece regardless of its thickness. Guide member 20 can be mounted to frame 21 as seen in FIG. 4A directly or through rod 23 extending from guide 20. This arrangement permits the horizontal distance of the wheels from the guide fence to be adjusted by laterally moving guide 20 away from frame 21 and tightening set screw 24 on sliding rod 23. This embodiment can also be reversed and used on the opposite side of the fence when cutting on the other side of the blade. Stop members 46 held by guide 20 and 45 held by pin 44 through rod 19 limit the extension of spring 47.

Although the present invention has been described with reference to particular embodiments, it will be apparent to those skilled in the art that variations and modifications can be substituted therefor without departing from the principles and spirit of the invention.

I claim:

1. A device for holding down a work piece to be operated on by a device such as a table saw, against a flat table member while at the same time urging said work piece against a guide fence used on such devices, comprising:

a plate member;

a pair of wheels rotatably mounted on said plate member with at least a portion of each wheel extending beyond said plate member;

a first and second arm member, each having an upper and lower end, the lower ends of which are rotatably mounted on said plate member on a line parallel to a line between said wheel members;

a frame member having a first and second shaft rotatably retained therein positioned apart from one another substantially the distance of the lower ends of said arms in a line parallel to the rotational mountings of said lower ends on which are affixed the upper ends of said first and second arms respectively;

a spring member extending from the upper end of said second arm member to the lower end of said first arm member;

an auxiliary guide fence having at least one aperture defined therein for positioning adjacent to said guide fence for mounting said frame to said guide fence with said wheels at an angle inward toward said guide fence in the direction of the flow of the work piece;

a pin affixed to the bottom of said frame adapted to enter into said auxiliary fence's aperture(s);

a downwardly protruding member extending from the bottom of said frame on the other side of said guide fence from said auxiliary fence;

a clamp screw extending through said downwardly protruding member for tightening against said guide fence to hold said frame to said guide fence;

means to prevent reverse movement of said wheel members comprising a pawl member pivotally affixed to said plate between said wheels; and means to cause said pawl member to jam against said wheels upon rearward movement of same, including:

a horizontally extended aperture defined in said pawl in which said pivot member can move back and forth;

a vertically and horizontally extended aperture defined toward an end of said pawl;

a stop pin affixed to said frame and entering said vertically extended aperture;

said pawl adapted to extend on each end to rest on said wheels when they are in forward motion and when said wheels start rearward motion, said pawl is adapted to move by friction rearwardly, its pivot member moving in said horizontally extended aperture, forcing the ends of said pawl between the wheels and said stop pin preventing further rotational movement of said pawl beyond its contact with said wheels.

2. A device for holding down a work piece to be operated on by a device such as a table saw against a flat table member while at the same time urging said work piece against a guide fence used on such devices, comprising:

a plate member;

a pair of wheels rotatably mounted on said plate member with at least a portion of each wheel extending below said plate member;

a rod member, one end of which is rigidly affixed to said plate member;

a frame member affixed to said guide fence;

a guide member affixed to said frame member, having an aperture defined therein for receipt of said rod member positioning said wheels in the direction of the flow of said work piece;

spring means to urge said rod member away from said guide member to exert constant pressure by said wheels on said work piece;

height adjustment means on said rod member adapted to change the height of said wheels from said table;

lateral adjustment means affixed to said guide member and movable within said frame member adapted to adjust the distance of said wheels from said guide fence;

wherein said frame member is affixed to said guide fence by means further including:

an auxiliary fence having at least one aperture defined therein for positioning adjacent to said guide fence;

a pin affixed to the bottom of said frame adapted to enter into said auxiliary fence's aperture(s);

a downwardly protruding member extending from the bottom of said frame on the other side of said guide fence away from said auxiliary fence; and a clamp screw extending through said downwardly protruding member for tightening against said guide fence to hold said frame to said guide fence.

* * * * *